(12) United States Patent
Hanyu

(10) Patent No.: US 7,859,516 B2
(45) Date of Patent: Dec. 28, 2010

(54) INFORMATION PROCESSING APPARATUS, SCROLL CONTROL APPARATUS, SCROLL CONTROL METHOD, AND COMPUTER PROGRAM PRODUCT

(75) Inventor: Tomohiro Hanyu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 274 days.

(21) Appl. No.: 12/259,079

(22) Filed: Oct. 27, 2008

(65) Prior Publication Data
US 2009/0128484 A1   May 21, 2009

(30) Foreign Application Priority Data
Oct. 29, 2007   (JP) .............. 2007-280533

(51) Int. Cl.
*G09G 5/08*   (2006.01)
(52) U.S. Cl. ..................................... 345/158
(58) Field of Classification Search ................ 345/156, 345/157, 158, 173, 184
See application file for complete search history.

(56) References Cited

U.S. PATENT DOCUMENTS

| | | | |
|---|---|---|---|
| 5,602,566 A | 2/1997 | Motosyuku | |
| 6,624,824 B1 | 9/2003 | Tognazzini | |
| 7,289,102 B2* | 10/2007 | Hinckley et al. ............ | 345/156 |
| 7,721,968 B2* | 5/2010 | Wigdor ................. | 235/472.01 |
| 2007/0146321 A1* | 6/2007 | Sohn et al. .................. | 345/158 |
| 2008/0014987 A1* | 1/2008 | Kusuda et al. ........... | 455/556.1 |

FOREIGN PATENT DOCUMENTS

| | | |
|---|---|---|
| JP | 7-64754 | 10/1995 |
| JP | 10-49337 | 2/1998 |
| JP | 10-283160 | 10/1998 |
| JP | 2002-341991 | 11/2002 |
| JP | 2005-221816 | 8/2005 |

OTHER PUBLICATIONS

Japanese Office Action issued in 2007-280533, Jan. 7, 2009, 4 pages (including full English translation).

* cited by examiner

*Primary Examiner*—Quan-Zhen Wang
*Assistant Examiner*—Tom V Sheng
(74) *Attorney, Agent, or Firm*—Pillsbury Winthrop Shaw Pittman LLP (57) ABSTRACT

According to one embodiment, an information processing apparatus including a display unit and an inclination detection unit detecting an inclination of its main body includes a direction instruction unit, a reference inclination storage unit, an inclination difference output unit, and a scroll unit. The direction instruction unit instructs a scroll direction in which a display range of the display unit is to be moved. The reference inclination storage unit stores, as a reference inclination, an inclination in the scroll direction among inclinations detected by the inclination detection unit. The inclination difference output unit outputs a difference between the reference inclination and an inclination in the scroll direction. The scroll unit moves the display range on the display unit according to the difference outputted from the inclination difference output unit.

8 Claims, 8 Drawing Sheets

INFORMATION PROCESSING APPARATUS, SCROLL CONTROL APPARATUS, SCROLL CONTROL METHOD, AND COMPUTER PROGRAM PRODUCT

CROSS-REFERENCE TO RELATED APPLICATIONS

This application is based upon and claims the benefit of priority from Japanese Patent Application No. 2007-280533, filed Oct. 29, 2007, the entire contents of which are incorporated herein by reference.

BACKGROUND

1. Field

One embodiment of the invention relates to a technology for scrolling a screen.

2. Description of the Related Art

Information processing apparatuses such as personal computers have been used for various purposes such as documentation, table calculation, and web sight browsing, and are widespread for household and business purposes. As such information processing apparatuses, there are a desktop type apparatus having a display device and a main body separately and a portable type apparatus. Among the portable information processing apparatuses, there are a notebook type apparatus having a display device and a main body which are integrated, and also an apparatus of a size of being able to be carried by one hand.

In order to scroll a display screen of the portable information processing apparatus, a user operates an input device such as a keyboard, a mouse, and a touch pad.

However, when the user is holding the information processing apparatus, it is difficult or not possible to operate the input device to scroll the display screen with either one of right hand and left hand.

Accordingly, in a small-sized information processing apparatus used with being held by one hand, there is a conventional technology enabling the scrolling operation without using a hand which is not holding that small-sized information processing apparatus (for example, see Japanese Patent Application Publication (KOKAI) No. Hei 7-64754).

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus including a main body, a display unit, and an inclination detection unit detecting an inclination of the main body, includes: a direction instruction unit that instructs a scroll direction in which a display range of the display unit is to be moved; a reference inclination storage unit that stores, as a reference inclination, an inclination in the scroll direction when the scroll direction is instructed by the direction instruction unit among inclinations detected by the inclination detection unit; an inclination difference output unit that outputs an inclination difference between the reference inclination stored in the reference inclination storage unit and an inclination in the scroll direction detected by the inclination detection unit; and a scroll unit that moves the display range of the display unit in accordance with the inclination difference outputted from the inclination difference output unit.

According to another embodiment, a scroll control apparatus applied to an information processing apparatus including a main body, a display unit, a direction instruction unit instructing a scroll direction in which a display range of the display unit is to be moved, and an inclination detection unit detecting an inclination of the main body, includes: a storage control unit that causes, among inclinations detected by the inclination detection unit, an inclination in the scroll direction when the scroll direction is instructed by the direction instruction unit to be stored as a reference inclination; and an inclination difference output unit that outputs an inclination difference between the reference inclination stored by the storage control unit and an inclination in the scroll direction detected by the inclination detection unit.

According to still another embodiment, a scroll control method applied to an information processing apparatus including a main body, a display unit, a direction instruction unit instructing a scroll direction in which a display range of the display unit is to be moved, and an inclination detection unit detecting an inclination of the main body, includes: causing, among inclinations detected by the inclination detection unit, an inclination in the scroll direction when the scroll direction is instructed by the direction instruction unit to be stored as a reference inclination; outputting an inclination difference between the stored reference inclination and an inclination in the scroll direction detected by the inclination detection unit; and moving the display range of the display unit in accordance with the inclination difference outputted at the outputting.

According to still another embodiment, a computer program product implements the above method on a computer.

Figure 1:
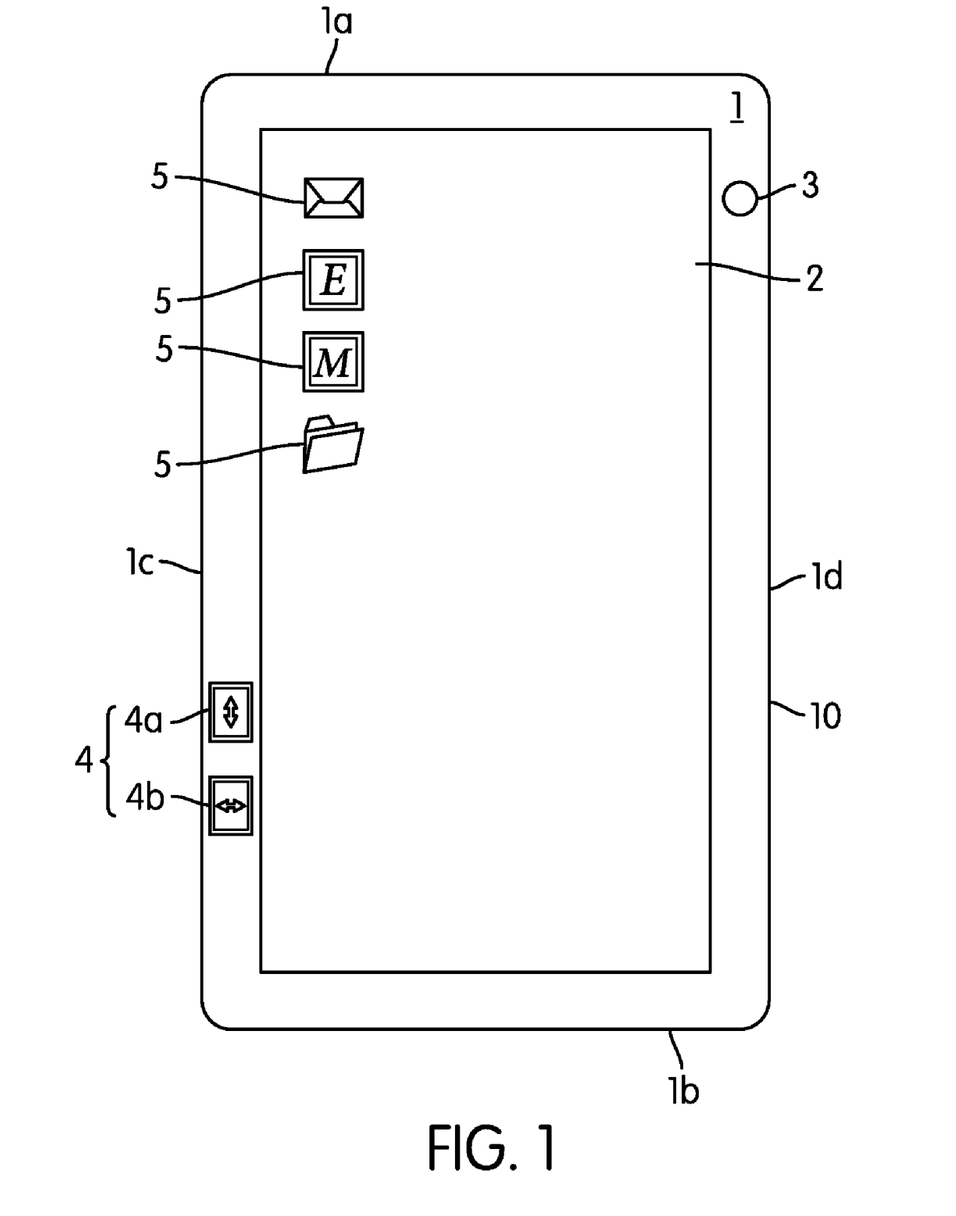
FIG. 1 is an exemplary plan view of an external appearance of a computer as an information processing apparatus according to an embodiment of the invention.
Figure 2:
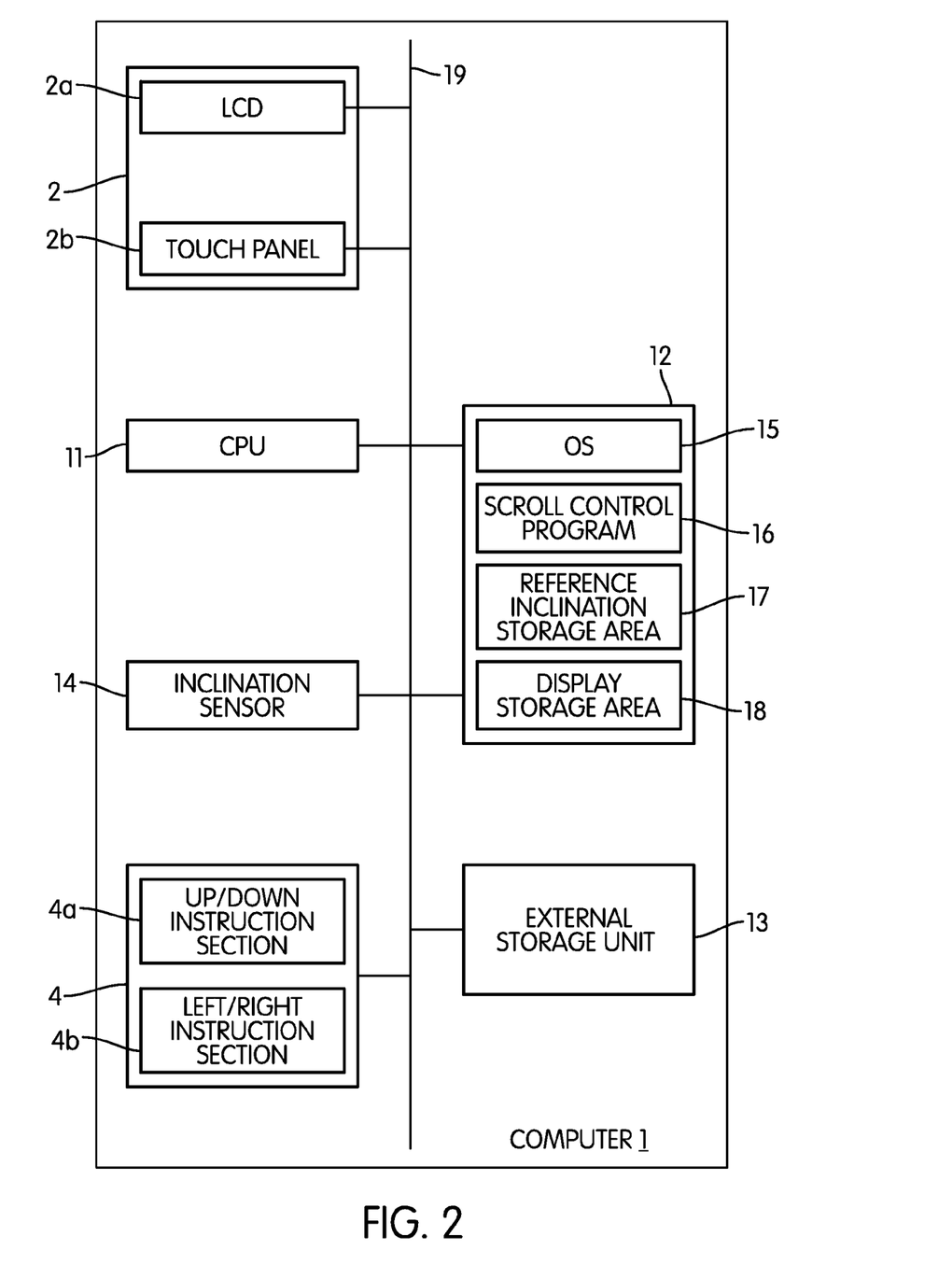
FIG. 2 is an exemplary block diagram of an internal configuration of the computer of FIG. 1 in the embodiment.

FIG. 1 is a plan view of an external appearance of a computer 1 as an information processing apparatus according to an embodiment of the invention. FIG. 2 is a block diagram of an internal configuration of the computer 1.

As illustrated in FIG. 1, the computer 1 is a tablet type computer in a size of being able to be carried by one hand, having a main body 10 of almost flat shape. In the embodiment, the computer 1 is used for portrait display as illustrated in FIG. 1, and in that case, the upper side of the main body 10 is denoted as an upper section 1*a*, the lower side is denoted as a lower section 1*b*, a left side is denoted as a left section 1*c*, and a right side is denoted as a right section 1*d*.

The computer 1 has a display unit 2 of a size occupying almost the entire area of one surface including a center, and a power switch 3 and a direction instruction section 4 which are disposed in the outside of the display unit 2.

The display unit 2 is an image display device and has a liquid crystal panel (LCD) 2*a* as illustrated in FIG. 2, and constitutes one of output devices of the computer 1. The display unit 2 has the LCD 2*a* and a touch panel 2*b*, and displays images such as icons 5 illustrated in FIG. 1 on the LCD 2*a* after power is turned on.

The touch panel 2*b* is disposed in a front surface side (visible side) of the LCD 2*a*, and senses a pressure or a static electricity applied by using an operation input device such as a finger and a stylus pen, to output data indicating that pressure or the like. In a case of the computer 1, instead of using an input device such as a keyboard and a touch pad, a user performs a writing action or the like by making, for example, a stylus pen (not illustrated) touch the display unit 2 to directly write a letter, whereby operations such as data input and command input can be performed.

The power switch 3 is a main power switch of the computer 1 which, when pressed down, causes the computer 1 to be turned on. The direction instruction section 4 has an up/down instruction section 4*a* and a left/right instruction section 4*b*, and is able to instruct a scroll direction (direction in which a display range of a screen is moved in the display unit 2) of either one of an up/down direction or a left/right direction of the main body 10 by the up/down instruction section 4*a* and the left/right instruction section 4*b*, having a function as a later-described scroll direction instruction unit 24.

The up/down instruction section 4*a* is a button to instruct the scroll direction to up/down. When the user is pressing down the up/down instruction section 4*a* by his finger or the like, the scroll direction is instructed to up/down, and when he takes his finger or the like off it, an instruction of that scroll direction is released. Details will be described later.

The left/right instruction section 4*b* is a button to instruct the scroll direction to left/right. When the user is pressing down the left/right instruction section 4*b* by his finger or the like, the scroll direction is instructed left/right, and when he takes his finger or the like off it, an instruction of that scroll direction is released.

An OS (Operating System) 15 such as Windows (registered trademark) is installed on the computer 1, and a plurality of programs can be executed at the same time under the control of the OS 15. Although not shown, program execution windows can be displayed on the display unit 2, and by the user's operation using the stylus pen, the position and size of the windows can be adjusted and a selected window can be displayed in the foreground.

Further, in addition to the aforementioned display unit 2 and the direction instruction section 4, the computer 1 has a CPU 11, an internal storage unit 12, an external storage unit 13, and an inclination sensor 14 as illustrated in FIG. 2, and these are connected by a bus 19.

The CPU 11 is a processor controlling the operation of the computer 1, and executes a program stored in the internal storage unit 12. As programs executed by the CPU 11, there can be cited a scroll control program 16 to control scrolling in the display unit 2, in addition to the OS 15. Further, among the programs executed by the CPU 11, there are application programs such as a documentation program, a program for creating and sending/receiving e-mail.

The internal storage unit 12 is a storage device storing mainly programs executed by the computer 1, and can be a RAM, a flash memory, or an HDD (Hard Disk Drive), for example. In the computer 1, as illustrated in FIG. 2, the OS 15 and the scroll control program 16 are stored in the internal storage unit 12. Further, the internal storage unit 12 is provided with a reference inclination storage area 17 storing a later-described reference inclination and a display storage area 18 in which display data 102 is stored.

The external storage unit 13 is a storage device storing programs to be executed, and can be a flash memory, a hard disk device, a CD reader, or a DVD reader, for example. Unlike the internal storage unit 12, the external storage unit 13 stores a program which is infrequently accessed by the CPU 11 and a program which is not currently being executed.

The inclination sensor 14 has a sensor detecting an inclination of the main body 10 and an interface outputting the detected inclination as inclination value data, and has functions as a later-described inclination detection unit 21 and an inclination value acquisition unit 22.

The inclination sensor 14 detects inclinations in the up/down direction (direction along the upper section 1*a* and the lower section 1*b*) and the left/right direction (direction along the left section 1*c* and the right section 1*d*) of the main body 10 individually, and AD-converts the detected inclination and outputs the respective inclination value data of the up/down direction and the left/right direction. It should be noted that the inclination can be detected by using an acceleration sensor instead of the inclination sensor 14, with an orientation of gravitational acceleration being a reference, illustration being omitted.

Figure 3:
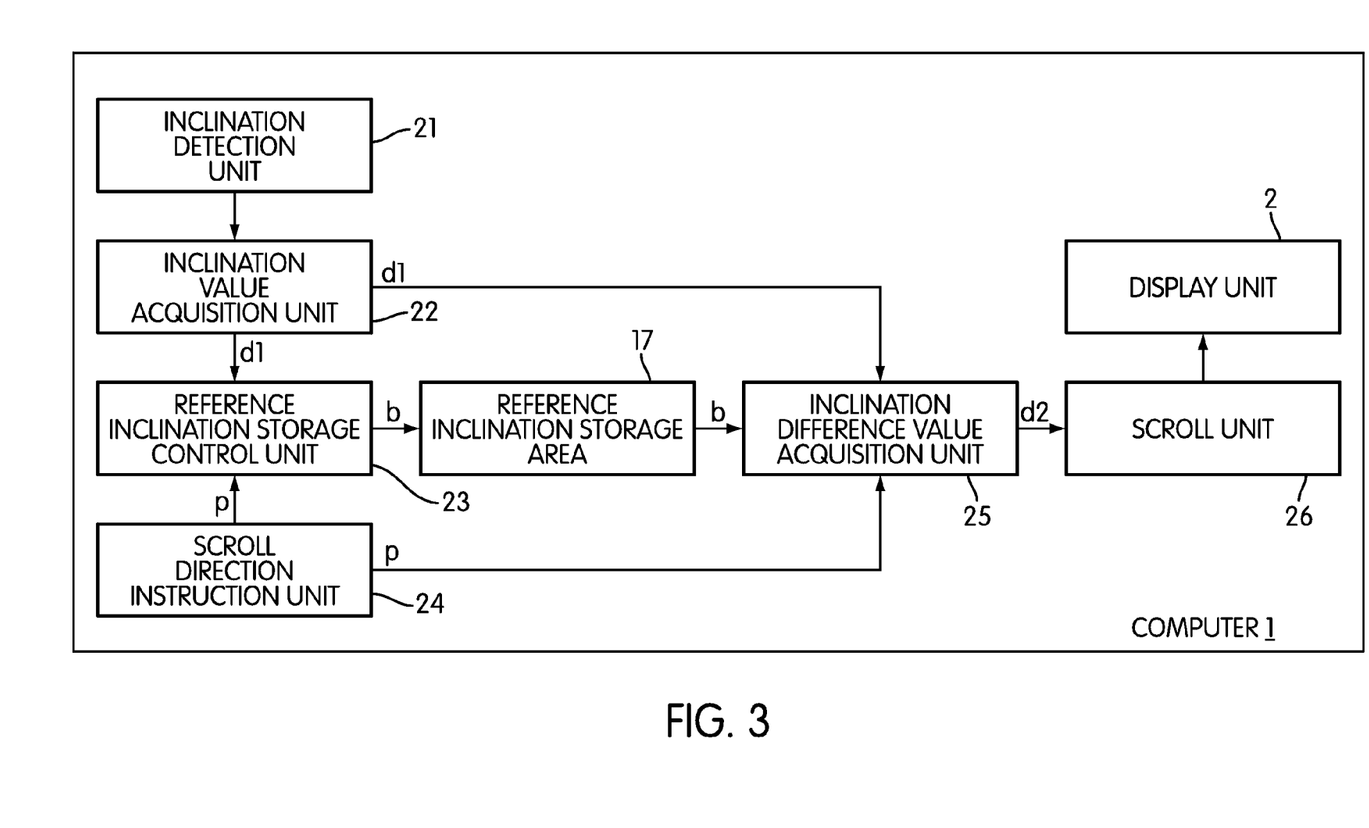
FIG. 3 is an exemplary functional block diagram of a part related to scroll control of the computer of FIG. 1 in the embodiment.

Next, a configuration of parts related to the scroll control in the computer 1 will be described with reference to FIG. 3. FIG. 3 is a functional block diagram of the parts related to the scroll control of the computer 1.

The computer 1 has, as the parts related to the scroll control, the aforementioned display unit 2 and the reference inclination storage area 17, and in addition, the inclination detection unit 21, the inclination value acquisition unit 22, a reference inclination storage control unit 23, and the scroll direction instruction unit 24, and further has an inclination difference value acquisition unit 25 and a scroll unit 26.

The inclination detection unit 21 has a function to detect the inclination of the computer 1, and is constituted with the aforementioned inclination sensor 14. The inclination value acquisition unit 22 has a function to acquire inclination value data by using the inclination detected by the inclination detection unit 21 and output it, and is also constituted with the inclination sensor 14.

The reference inclination storage control unit 23 has a function to make the reference inclination storage area 17 maintain, as a reference inclination, the inclination data of a direction corresponding to later-described direction instruction data P on receipt of the direction instruction data P from the scroll direction instruction unit 24 among the inclination value data obtained by the inclination value acquisition unit 22. The reference inclination storage control unit 23 is realized by the CPU 11 executing the scroll control program 16.

The scroll direction instruction unit 24 is a device to instruct a direction in which the screen of the display unit 2 is to be scrolled, by inclining the main body 10, and is constituted with the aforementioned direction instruction section 4. The scroll direction instruction unit 24 outputs the direction instruction data P indicating the scroll direction to the reference inclination storage control unit 23 and the inclination difference value acquisition unit 25.

The inclination difference value acquisition unit 25 has functions of acquiring inclination difference data d2 by reading a reference inclination b from the reference inclination storage area 17 and calculating a difference from the reference inclination b in a direction (scroll direction) along the direction instruction data P outputted from the scroll direction instruction unit 24 among inclination value data d1 outputted by the inclination value acquisition unit 22, and outputting the inclination difference value data d2 to the scroll unit 26. The inclination difference value data d2 indicates how far the user inclines the main body 10 after pressing down the direction instruction section 4.

For example, in a case that the reference inclination b is 50 degrees in the down direction, when the inclination value data d1 currently outputted from the inclination value acquisition unit 22 is 90 degrees in the down direction, the inclination difference value data d2 becomes 40 degrees. It should be noted that the inclination difference value acquisition unit 25 is realized by the CPU 11 executing the scroll control program 16.

Further, a scroll control apparatus is constituted with the reference inclination storage control unit 23 and the inclination difference value acquisition unit 25.

The scroll unit 26 has a function to move a range of an image to be displayed on the LCD 2a, and a display range is changed by change of an upper-left coordinate for displaying the data on the LCD 2a or operation of a scroll bar.

Figure 4:
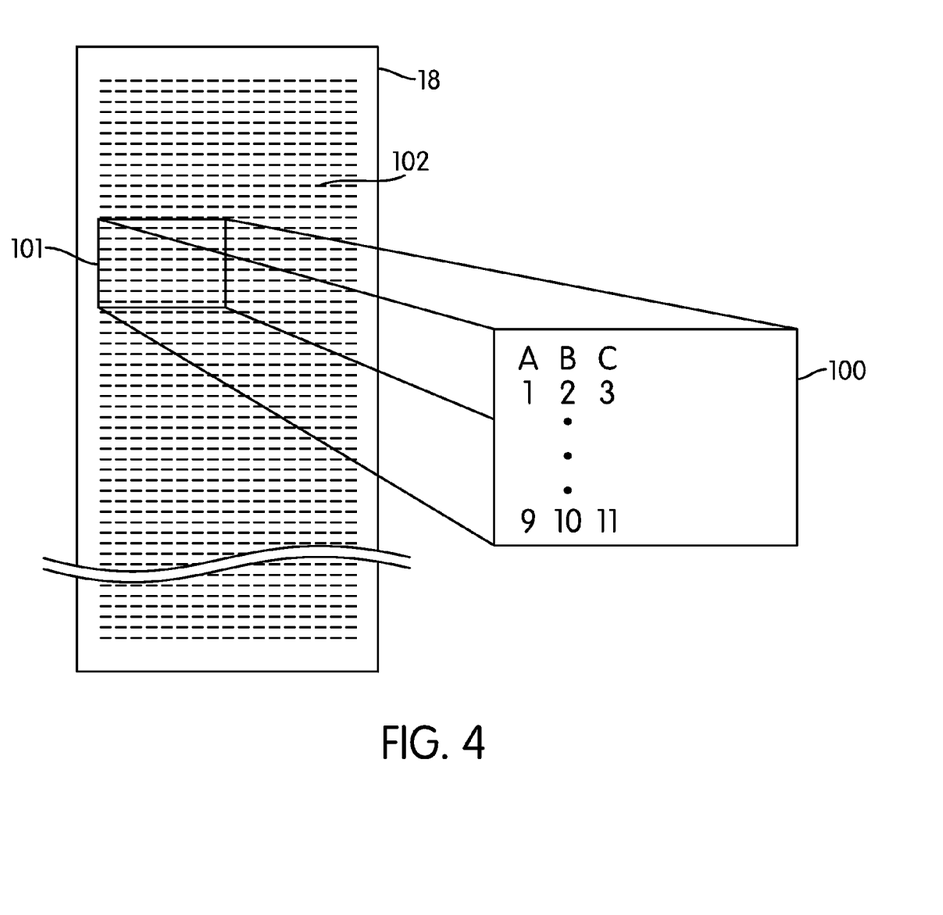
FIG. 4 is an exemplary schematic diagram for explaining a function of a scroll unit in the embodiment.

For example, as illustrated in FIG. 4, the scroll unit 26 reads the display data 102 for one screen from a point indicated by point data 101, the display data 102 being stored in the display storage area 18, and makes the display data 102 displayed on the LCD 2a of the display unit 2. Then, the scroll unit 26 adds a value corresponding to the inclination difference value data d2 to the point data 101, so that scrolling to move the display range of a display screen 100 up is performed. The scroll unit 26 also subtracts a value corresponding to the inclination difference value data d2 from the point data 101, so that scrolling to move the display range down is performed.

Figure 5A:
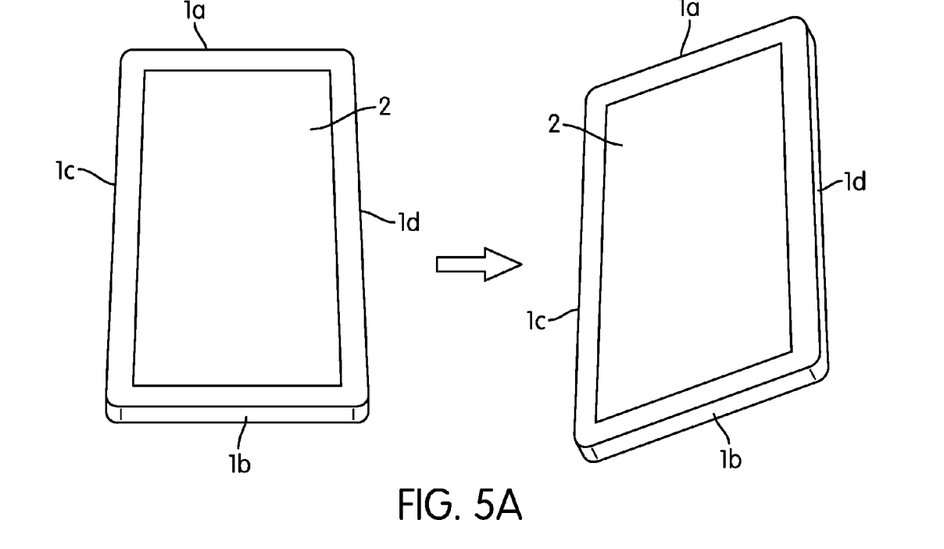
FIGS. 5A and 5B are exemplary views of the external appearances of the computer of FIG. 1 inclined to the left side and the right side in the embodiment.
Figure 5B:
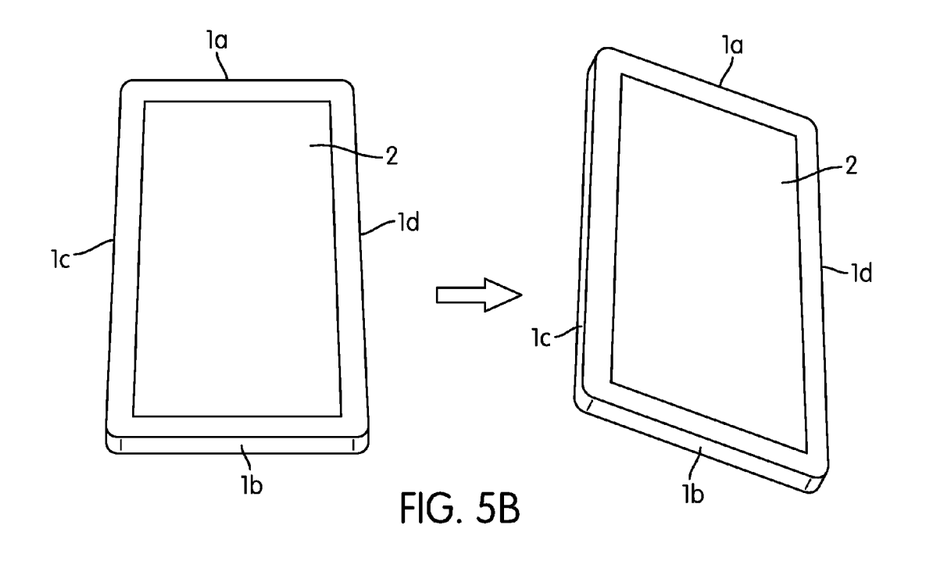
Figure 6A:
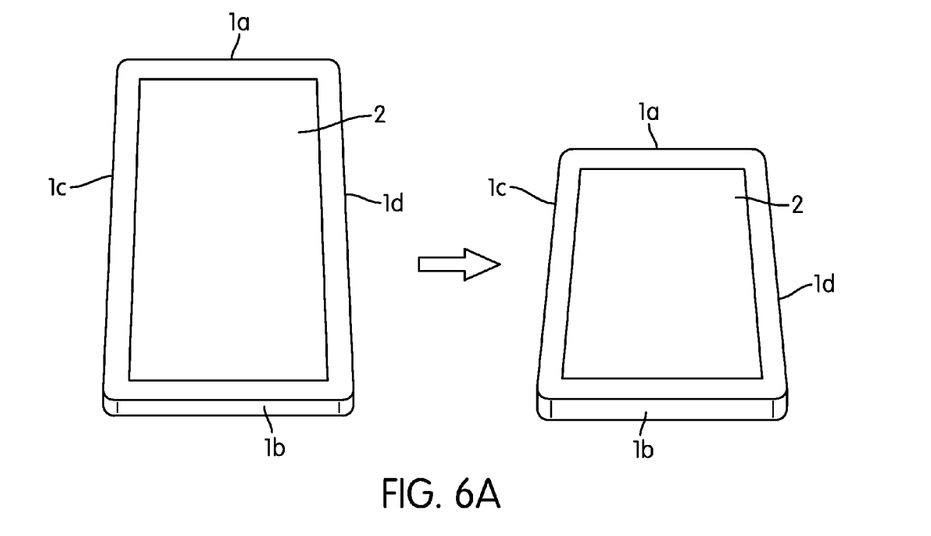
FIGS. 6A and 6B are exemplary views of external appearances of the computer of FIG. 1 inclined to the upper side and the lower side in the embodiment.
Figure 6B:
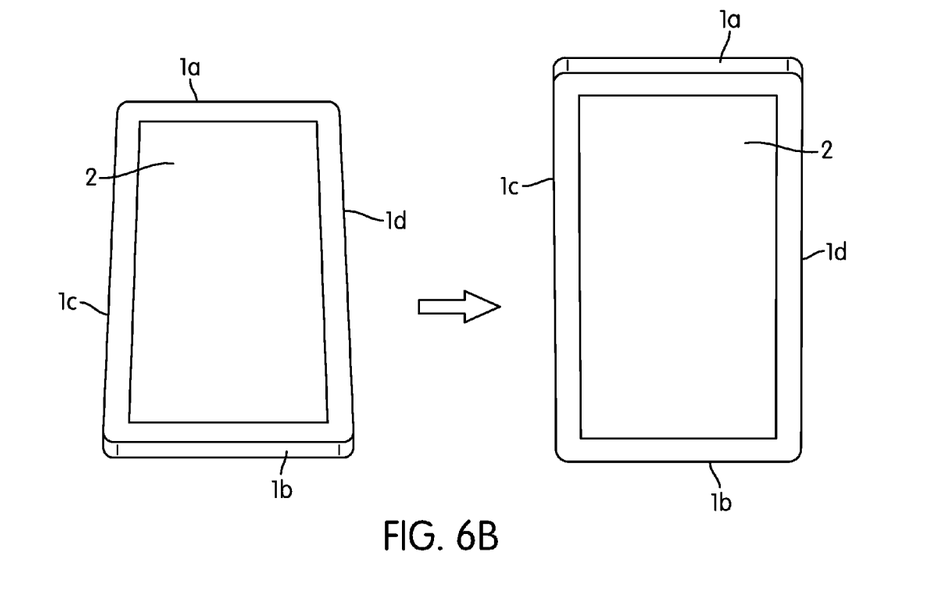
Figure 7:
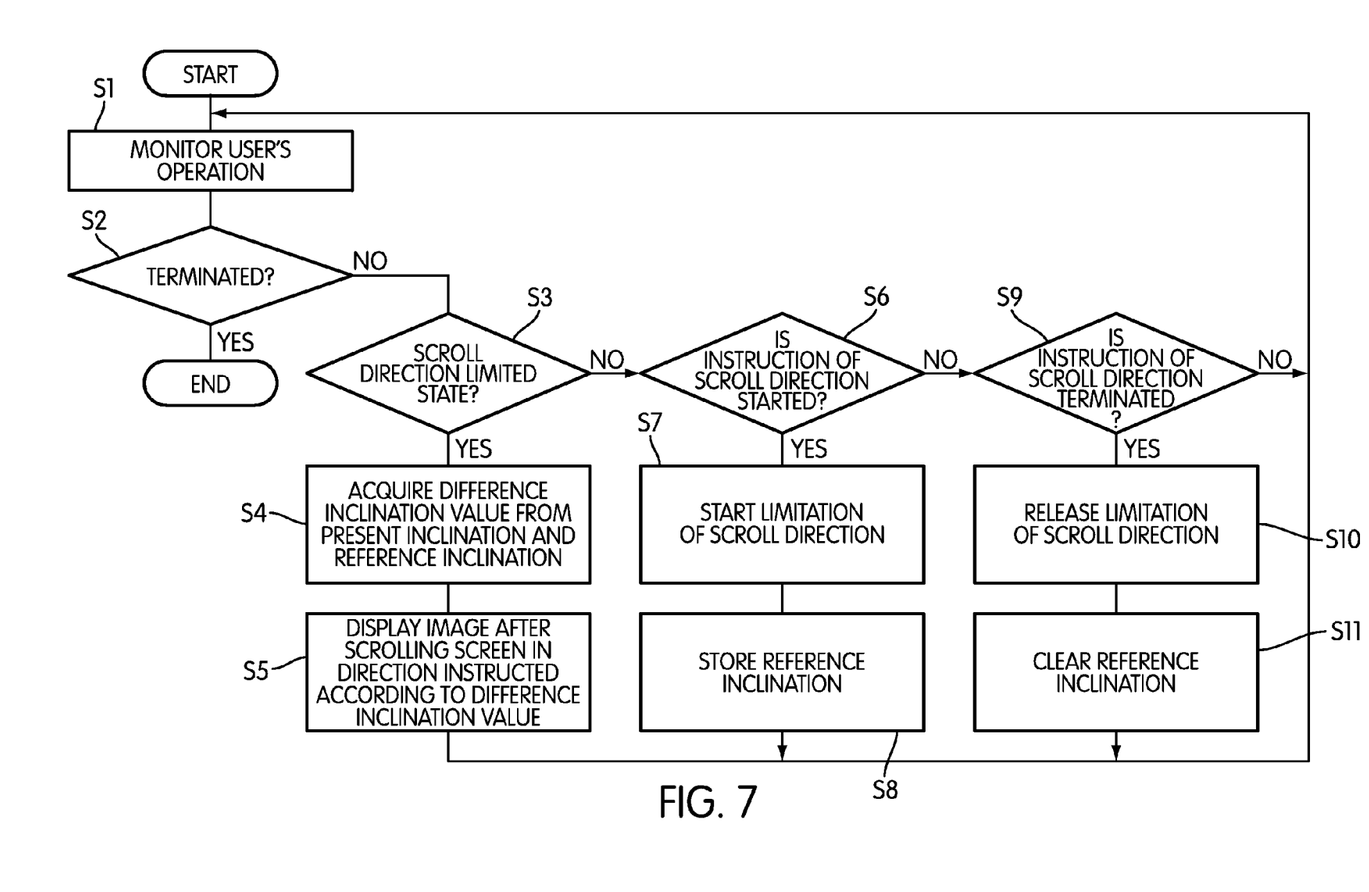
FIG. 7 is an exemplary flowchart of a procedure of scroll control in the computer in the embodiment.

Next, operation of the computer 1 will be described with reference to FIG. 5A to FIG. 7. FIGS. 5A and 5B are views of external appearances of the computer 1 when being inclined. The computer 1 is inclined to a left side in FIG. 5A, while it is inclined to a right side in FIG. 5B. FIGS. 6A and 6B are also views of external appearances of the computer 1 when being inclined. The computer 1 is inclined to the upper side in FIG. 6A, while it is inclined to the lower side in FIG. 6B. FIG. 7 is a flowchart of a procedure of scroll control in the computer 1. The scroll control is realized by the CPU 11 operating in accordance with the scroll Control program 16.

When starting operation in accordance with the scroll control program 16, the CPU 11 proceeds the operation to S1 to monitor the user's operation. While the power is on, the user activates the application program to perform operations such as documentation and e-mail transmission/reception, and meanwhile the user also terminates the active application program or performs an operation (termination operation) to terminate the OS 15 and turn off the power.

In subsequent S2, the CPU 11 judges whether or not the user's operation is the termination operation (for example, termination operation of the OS 15 or the scroll control program 16). If the operation is the termination operation, the CPU 11 terminates the scroll control program 16, and otherwise the CPU 11 proceeds the operation to S3.

When proceeding the operation to S3, the CPU 11 judges whether or not the computer 1 is in a scroll direction limited state. In this case, the CPU 11 judges whether or not the computer 1 is set to the scroll direction limited state by whether or not input of the direction instruction data P is provided through the direction instruction section 4. When the direction instruction data P is provided, that is, when either one of the up/down instruction section 4a and the left/right instruction section 4b of the direction instruction section 4 is pressed down, the computer 1 is in the scroll direction limited state and the operation is proceeded to S4, and otherwise the operation is proceeded to S6.

In this case, the CPU 11 performs S4 and S5 only when the direction instruction section 4 is pressed down and the scroll direction is instructed, whereby the CPU 11 performs an operation as an output control unit.

When proceeding the operation to S4, the CPU 11 receives the inclination value data d1 from the inclination sensor 14, and meanwhile sets that inclination value data d1 as the present inclination, calculating the difference between the present inclination and the reference inclination b to acquire the inclination difference value data d2. Further, the CPU 11 outputs the acquired inclination difference value data d2 to the scroll unit 26.

In subsequent S5, the CPU 11 performs an operation as the scroll unit 26. Specifically, the CPU 11 scrolls the screen in the instructed scroll direction in accordance with the inclination difference value data d2 acquired and outputted in S4, and makes the display unit 2 display an image after scrolling. Thereafter, the CPU 11 returns to S1 and repeats the operations.

When proceeding the operation to S6, the CPU 11 judges whether or not the instruction of the scroll direction is started. In this case, the CPU 11 judges whether or not the instruction of the scroll direction is started by whether or not input of the direction instruction data P is newly provided through the direction instruction section 4. When the direction instruction data P is newly provided, the CPU 11 proceeds the operation to S7, and otherwise the CPU 11 proceeds the operation to S9.

When the CPU 11 proceeds the operation to S7, limitation of the scroll direction is started to bring about the scroll direction limited state. In subsequent S8, the CPU 11 performs an operation as a storage control unit, so that the reference inclination storage area 17 stores and maintains, as the reference inclination b, the inclination value data d1 of the direction along the direction instruction data P at start of limiting the scroll direction among the inclination value data d1 from the inclination sensor 14. The reference inclination b is maintained until the direction instruction section 4 is released from being pressed. Thereafter, the CPU 11 returns to S1 and repeats the operation.

Here, for example, if the user newly presses down the up/down instruction section 4a, the inclination value data d1 of a longitudinal direction is stored as the reference inclination b in the reference inclination storage area 17. The main body 10 may be inclined not only in the longitudinal direction but also in a lateral direction depending on how the main body 10 is held, as in a case that the user inclines the main body 10 to upper right, but in the reference inclination storage area 17 is stored only the inclination value data d1 of the up/down direction along the direction instruction data P among the inclination value data d1 from the inclination sensor 14.

Next, when proceeding the operation from S6 to S9, the CPU 11 judges whether or not the instruction of the scroll direction is terminated. In this case, the CPU 1 judges whether or not the instruction of the scroll direction is terminated by whether or not input of the direction instruction data P from the direction instruction section 4 is terminated, that is, whether the direction instruction section 4 is released from being pressed down.

When input of the direction instruction data P is terminated, the CPU 11 proceeds the operation to S10 to release the scroll direction limited state. Further, in subsequent S11, the CPU 11 performs an operation as a reference inclination deletion unit, and deletes the reference inclination b stored at that time from the reference inclination storage area 17, and then returns to S1. When the direction instruction data P is not received, that is, when the direction instruction section 4 is not being pressed down, the CPU 11 returns to S1 and repeats the above-described operations. In this case, although not shown, the inclination difference data d2 is set to be "0" (zero).

As described above, in the computer 1, when the user presses down the direction instruction section 4 with the finger or the like in order to instruct the scroll direction, the inclination in the direction corresponding to the direction instruction section 4 pressed down is stored as the reference inclination b, and the screen is scrolled in accordance with the inclination difference from the reference inclination b. Accordingly, the computer 1 has a function to limit the scroll direction due to the inclination, so that scrolling is performed only in the direction intended by the user.

For example, when the user inclines the main body 10 to left and right as illustrated in FIG. 5A and FIG. 5B while pressing down the left/right instruction section 4b of the direction instruction section 4, the reference inclination b is stored based on the inclination value data of the left/right direction. Thus, the screen is scrolled in the left direction in a case of FIG. 5A, while the screen is scrolled in the right direction in a case of FIG. 5B. However, when the user inclines the main body 10 to left/right while pressing down the up/down instruction section 4a of the direction instruction section 4, the screen is not scrolled in the left/right direction. It is because, in this case, the reference inclination b is based on the inclination value data of the up/down direction and scrolling is performed in accordance with the inclination difference from the reference inclination b in the direction along the up/down direction.

Therefore, it is possible to limit the scroll direction to the up/down direction by pressing down the up/down instruction section 4a. That is, for example, even if the main body 10 is inclined in the upper right direction, the screen is scrolled only in the up direction. A conventional information processing apparatus does not have a function to limit a scroll direction by an inclination. Thus, when a user desires to scroll a screen in an up direction, the user needs to incline the information processing apparatus accurately in the up direction, and difficult operations are sometimes required. However, in the computer 1, such an operation is not required.

As stated above, the computer 1 can limit the direction of scrolling when the main body 10 is inclined for scrolling. Therefore, it is possible to perform scrolling accurately in the direction the user desires without forcing the user to perform a delicate and difficult operation, so that usability can be improved.

Meanwhile, when the user inclines the main body 10 to up/down while pressing down the up/down instruction section 4a of the direction instruction section 4, the screen is scrolled in the up direction in a case of FIG. 6A, while the screen is scrolled in the down direction in a case of FIG. 6B. However, if the user inclines the main body 10 to up/down while pressing down the left/right instruction section 4b, the screen is not scrolled in the up/down direction.

When the user ceases pressing down of the direction instruction section 4, the operation proceeds from S9 to S10 and S11 and the reference inclination b is deleted, and a new reference inclination b is stored according to the direction instruction section 4 pressed down next. Therefore, for example, if the user performs scrolling in the up/down direction and then desires to perform scrolling in the left/right direction, the user inclines the main body 10 to up/down while pressing down the up/down instruction section 4a with the finger or the like so that scrolling in the up/down direction is performed, and thereafter the user once releases the finger or the like and subsequently presses down the left/right instruction section 4b by the finger or the like.

Figure 8:
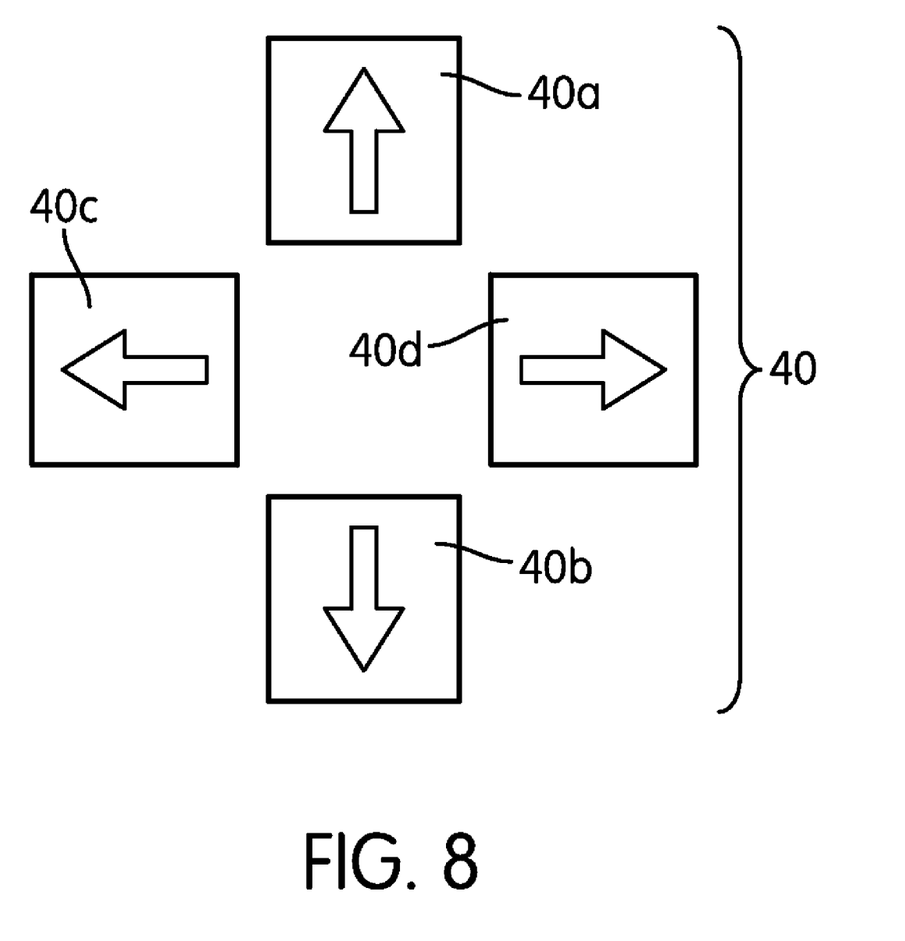
FIG. 8 is an exemplary diagram of a configuration of another direction instruction unit in the embodiment.

In the computer 1, the direction instruction section 4 instructs the scroll direction in two ways of the up/down direction and the left/right direction. The computer 1 can be provided with a direction instruction unit 40 illustrated in FIG. 8, instead of the direction instruction section 4. The direction instruction unit 40 has an up instruction section 40a, a down instruction section 40b, a left instruction section 40c and a right instruction section 40d, and can instruct the direction in four ways of up, down, left, and right.

Further, to the computer 1, it is possible to apply a touch sensor type switch instead of a button switch as the direction instruction section 4. For example, the touch sensor type switch can be constituted with an image of a button displayed on a screen and an input interface to receive input data corresponding to a touch thereon. In this case, states equivalent to those of the button switch can be indicated by two states of "valid state" equivalent to pressing down of the button switch and "invalid state" equivalent to not pressing down of the button switch.

In addition, the direction instruction device can be a device (for example, a touch pad) which can sense being touched and moved while being touched, in stead of the button switch. While being touched and moved, such a device can instruct a scroll direction based on a direction of moving, and thus the scroll unit 26 can perform scrolling in a direction limited by the instruction.

Further, the scroll unit 26 can change a speed of scrolling in accordance with the inclination difference. For example, when the inclination difference is small, scrolling is performed slowly, and when the inclination difference is large, scrolling is performed fast, and so on.

The above description is to describe an embodiment of the invention and, in no case, limits the apparatus and method of the invention, and various modifications can be easily embodied. Further, an apparatus and a method structured by appropriately combining the components, functions, features or steps of the method in respective embodiments are also within the scope of the invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus including a main body, a display unit, and an inclination detection unit detecting an inclination of the main body, the information processing apparatus comprising:

a direction instruction unit that instructs a scroll direction in which a display range of the display unit is to be moved;

a reference inclination storage unit that stores, as a reference inclination, an inclination in the scroll direction when the scroll direction is instructed by the direction instruction unit among inclinations detected by the inclination detection unit;

an inclination difference output unit that outputs an inclination difference between the reference inclination stored in the reference inclination storage unit and an inclination in the scroll direction detected by the inclination detection unit; and a scroll unit that moves the display range of the display unit in accordance with, the inclination difference outputted from the inclination difference output unit.

2. The information processing apparatus according to claim 1, further comprising:

an inclination value acquisition unit that acquires an inclination value indicating an inclination of the main body based on a detection result obtained by the inclination detection unit; and an inclination difference value acquisition unit that acquires an inclination difference value indicating the inclination difference from a difference between the reference inclination stored in the reference inclination storage unit and the inclination value acquired by the inclination value acquisition unit, wherein the inclination difference output unit outputs the inclination difference value acquired by the inclination difference value acquisition unit to the scroll unit.

3. The information processing apparatus according to claim 2, further comprising a storage control unit that controls the reference inclination storage unit to store an inclination value in the scroll direction acquired by the inclination value acquisition unit when the scroll direction is instructed by the direction instruction unit.

4. The information processing apparatus according to claim 1, further comprising an output control unit that controls the inclination difference output unit to output the inclination difference only when the scroll direction is instructed by the direction instruction unit.

5. The information processing apparatus according to claim 1, further comprising a reference inclination deletion unit that deletes the reference inclination stored in the reference inclination storage unit when an instruction by the direction instruction unit as to the scroll direction is released.

6. The information processing apparatus according to claim 1, wherein the direction instruction unit is configured to instruct a vertical direction or a horizontal direction with respect to the main body as the scroll direction.

7. A computer program product embodied on a computer-readable medium and comprising codes that, when executed on a computer including a main body, a display unit, a direction instruction unit instructing a scroll direction in which a display range of the display unit is to be moved, and an inclination detection unit detecting an inclination of the main body, causes the computer to perform:

causing, among inclinations detected by the inclination detection unit, an inclination in the scroll direction when the scroll direction is instructed by the direction instruction unit to be stored as a reference inclination;

outputting an inclination difference between the stored reference inclination and an inclination in the scroll direction detected by the inclination detection unit; and moving the display range of the display unit in accordance with the inclination difference, outputted at the outputting.

8. A scroll control method applied to an information processing apparatus including a main body, a display unit, a direction instruction unit instructing a scroll direction in which a display range of the display unit is to be moved, and an inclination detection unit detecting an inclination of the main body, the scroll control method comprising:

causing, among inclinations detected by the inclination detection unit, an inclination in the scroll direction when the scroll direction is instructed by the direction instruction unit to be stored as a reference inclination;

outputting an inclination difference between the stored reference inclination and an inclination in the scroll direction detected by the inclination detection unit; and moving the display range of the display unit in accordance with the inclination difference outputted at the outputting.

* * * * *